(12) United States Patent
Emminizer

(10) Patent No.: US 6,657,740 B1
(45) Date of Patent: Dec. 2, 2003

(54) METHOD OF PRINTING PORTION OF DOCUMENT WITH ACCOUNTABILITY AND ERROR DETECTION

(75) Inventor: David L. Emminizer, Davidsonville, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 0 days.

(21) Appl. No.: 09/393,574

(22) Filed: Sep. 10, 1999

(51) Int. Cl.⁷ .............................. G06F 3/12; G06F 13/00
(52) U.S. Cl. ...................... 358/1.14; 358/1.15
(58) Field of Search .............................. 358/1.14, 1.13, 358/1.11, 1.9, 1.6, 1.2, 1.15, 1.16, 1.17, 1.18, 504, 528, 538, 540, 403, 406, 413, 488, 296

(56) References Cited

U.S. PATENT DOCUMENTS

| | | | |
|---|---|---|---|
| 4,679,153 A | | 7/1987 | Robinson et al. ............ 345/468 |
| 5,293,466 A | | 3/1994 | Bringmann .................. 395/114 |
| 5,328,278 A | * | 7/1994 | Kokubo ........................ 400/74 |
| 6,047,093 A | * | 4/2000 | Lopresti et al. ............. 382/310 |
| 6,144,950 A | * | 11/2000 | Davies et al. ............... 705/401 |

\* cited by examiner

Primary Examiner—Gabriel Garcia
Assistant Examiner—Douglas Tran
(74) Attorney, Agent, or Firm—Robert D. Morelli

(57) ABSTRACT

The present invention is a method of printing in an accountable manner with error detection, by receiving a document in a human-readable printer command language; generating a table of contents that lists each data file in the document and the pages on which they would appear; selecting a data file to print; determining on which pages the selected data file would appear; converting the data records and the control records to machine-readable format; checking each converted sequence number and check-sum number the same as received and reporting any discrepancy and stopping if an error occurred; sending the converted data files to the printer if no discrepancy exists; comparing the number of pages sent to the printer to the number of pages printed, reporting any discrepancy, and stopping if any discrepancy exists; comparing the sequence number and sum-check number for each data record and each control record sent to the printer to the same as received, reporting any discrepancy, and stopping if any discrepancy exists; returning to the step of selecting a data file to print if it is desired to print another data file; and commanding the printer to print a report of what was printed.

9 Claims, 1 Drawing Sheet

METHOD OF PRINTING PORTION OF DOCUMENT WITH ACCOUNTABILITY AND ERROR DETECTION

FIELD OF THE INVENTION

The present invention relates, in general, to information processing system organization and, in particular, to static presentation processing (e.g., for a printer).

BACKGROUND OF THE INVENTION

A printer command language is a human-readable computer language for creating a document that is intended to be printed on a printer. Impress, Postscript, HP PCL, and HP GL are examples of printer command languages. A document created in a human-readable printer command language may require a conversion from machine-readable format before the document may be printed. A binary format is often used as the machine-readable format.

A document is often made up of different sections, or data files. Each data file is comprised of one or more data records, where the data records comprise the image of that particular data file. Each data record has associated therewith a control record. A control record controls various aspects of its corresponding data record such as font type and font size. Each data record and each control record includes a sequence number and a check-sum number. The sequence number allows a user to determine the sequence of the data records and the control records. The check-sum number, which was created from the content of the corresponding data record or control record, allows the user to detect an error in the data record, or control record.

A prior art method of printing a document created using the Impress printer command language requires the use of a computer between the computer on which the document was created and the printer. Such a method has numerous drawbacks. First, a second computer is required. Second, the prior art method only allows the user to print the entire document and not the pages on which may be found a particular data file. Therefore, a problem with the printing of one page in the document (e.g., smeared ink, wrinkled paper, etc.) would require the entire document to be reprinted. There are numerous applications where it is undesirable to print more than one of a document (e.g., lottery tickets, deeds, titles, secure-access material, etc.). Third, the prior art method discards the sequence numbers and the check-sum numbers associated with the data records and the control records and, therefore, prevents the prior art method from providing accountability and error detection of what was printed. The present method overcomes all of the problems of the prior art method.

U.S. Pat. No. 4,679,153, entitled "PRINTING SYSTEMS FOR TYPESETTER EMULATION," is an example of the prior art printing method described above that requires a second computer in addition to the computer on which a document is created, only allows the user to print the entire document and not the pages on which may be found a particular data file, and discards the sequence numbers and the check-sum numbers associated with the data records and the control records. Therefore, U.S. Pat. No. 4,679,153 does not include accountability and error detection as does the present invention. U.S. Pat. No. 4,679,153 is hereby incorporated by reference into the specification of the present invention.

U.S. Pat. No. 5,293,466, entitled "METHOD AND APPARATUS FOR SELECTING INTERPRETER FOR PRINTER COMMAND LANGUAGE BASED UPON SAMPLE OF PRINT JOB TRANSMITTED TO PRINTER," is another example of the prior art printing method described above that only allows the user to print the entire document and not the pages on which may be found a particular data file, and discards the sequence numbers and the check-sum numbers associated with the data records and the control records. U.S. Pat. No. 5,293,466 incorporates the functionality of the second computer in the prior art method described into the printer but does not eliminate it. Therefore, U.S. Pat. No. 5,293,466 does not include accountability and error detection as does the present invention. U.S. Pat. No. 5,293,466 is hereby incorporated by reference into the specification of the present invention.

SUMMARY OF THE INVENTION

It is an object of the present invention to print a portion of a document in an accountable manner.

It is another object of the present invention to print a portion of a document in an accountable manner with error detection.

The present invention is method of printing in an accountable manner with error detection.

The first step of the method isgNorm:
I receiving a document in a human-readable printer command language. The document includes at least one data file. A data file includes at least one data record and at least one control record. Each data record includes an image in the document, a sequence number, and a check-sum number. Each data record is associated with a control record. Each control record includes a font type, a font size, a sequence number, and a check-sum number.

The second step is generating a table of contents that lists each data file in the document and each page on which each data file would appear if that data file was printed.

The third step is selecting a data file to print.

The fourth step is determining on which pages the selected data file would appear if printed.

The fifth step is converting each data record and each control record, including the corresponding sequence number and the check-sum number, on the pages identified in the fourth step from the human-readable printer command language of the document to a machine-readable format that a printer may print.

The sixth step is checking each sequence number and check-sum number converted in the fifth step to the corresponding sequence number and check-sum number in the document received to see if the data records and the control records converted in the fifth step are in the same sequence as in the document received and if any error occurred as a result of the fifth step, reporting any discrepancy, and stopping if any discrepancy exists.

The seventh step is sending the result of the fifth step to the printer for printing.

The eighth step is comparing how many pages were sent to the printer in the seventh step to how many pages were actually printed by the printer, reporting any discrepancy, and stopping if any discrepancy exists.

The ninth step is comparing the sequence numbers and the check-sum numbers for the data records and the control records sent to the printer in the seventh step to the corresponding sequence numbers and check-sum numbers in the document as received, reporting any discrepancy, and stopping if any discrepancy exists.

The tenth step is returning to the third step if it is desired to print another data file.

The eleventh, and last, step is commanding the printer to print a report of what was printed.

DETAILED DESCRIPTION

Figure 1:
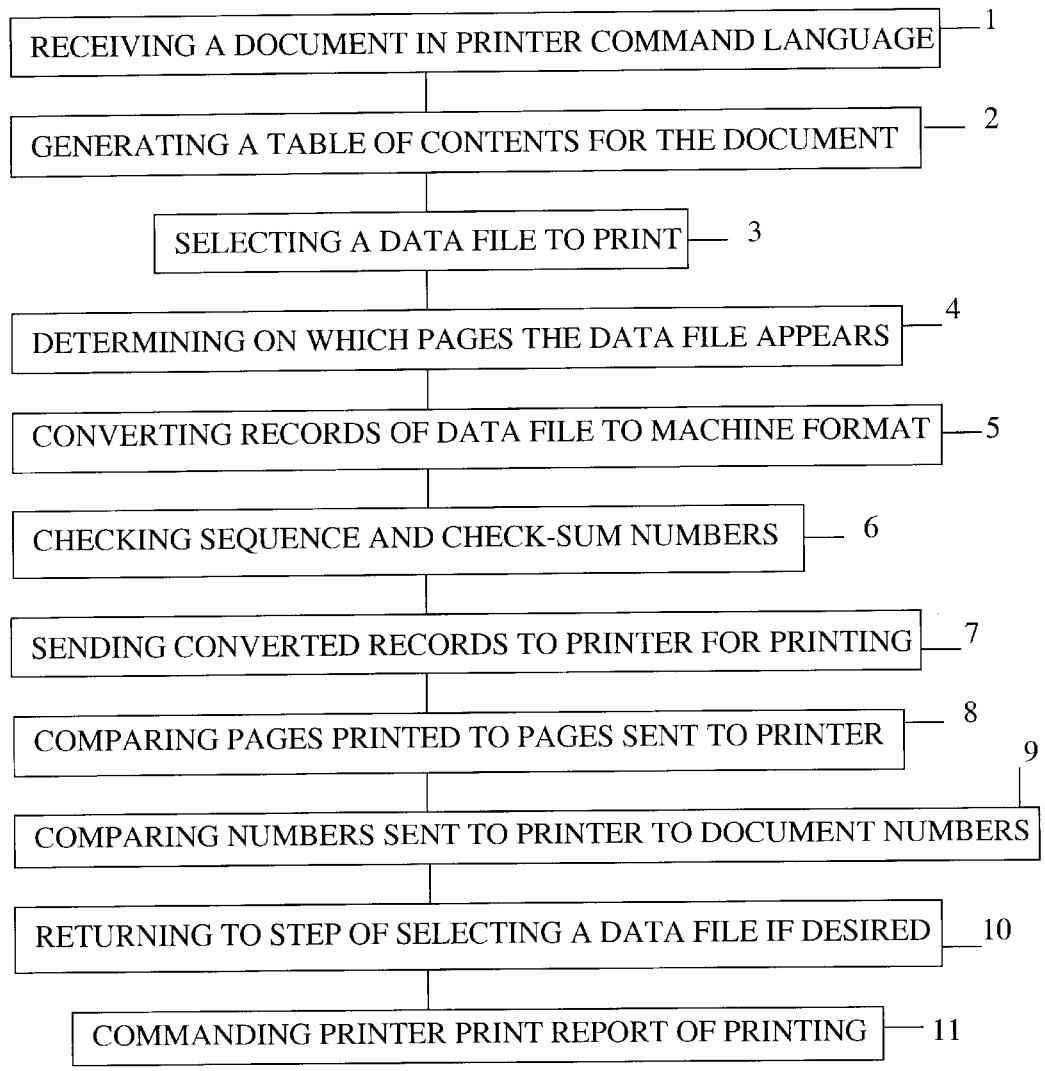
FIG. 1 is a flowchart of steps of the present invention.

The present invention is method of printing in an accountable manner with error detection. FIG. 1 is a list of the steps of the present invention.

The first step 1 of the method is receiving a document in a human-readable printer command language. The document includes at least one data file. A data file includes at least one data record and at least one control record. Each data record includes an image in the document, a sequence number, and a check-sum number. Each data record is associated with a control record. Each control record includes a font type, a font size, a sequence number, and a check-sum number. Typically, ASCII is used as the human-readable format. Examples of human-readable printer command languages include Impress, Postcript, HP PCL, and HP GL. If Impress is used, the data record includes a header for the data file and details of the data file and the control record includes a header for a family table and details of the family table.

The second step 2 is generating a table of contents that lists each data file in the document and each page on which each data file would appear if that data file was printed. If Impress is used, the second step 2 is comprised of generating a table of contents that includes the name of the data file, a page number on which the data file would appear if printed, the number of details of the data file, the position of the first of the details of the data file, and a pointer to a table of contents of the associated family table that includes the number of details of the family table and the position of the first of the details of the family table.

The third step 3 is selecting a data file to print.

The fourth step 4 is determining on which pages the selected data file would appear if printed.

The fifth step 5 is converting each data record and each control record, including the corresponding sequence number and the check-sum number, on the pages identified in the fourth step 4 from the human-readable printer command language of the document to a machine-readable format that a printer may print. Typically, the machine-readable format is binary. In the preferred embodiment, each instance of the letter i, the number zero, and the number one is replaced with "I", a zero with a forward slash there through, and "1", respectively. This eliminates any confusion between the letter i and the number 1, the number zero and the letter o, and the number 1 and the uncapitalized version of the letter L. The sixth step 6 is checking each sequence number and check-sum number converted in the fifth step 5 to the corresponding sequence number and check-sum number in the document received to see if the data records and the control records converted in the fifth step 5 are in the same sequence as in the document received and if any error occurred as a result of the fifth step, reporting any discrepancy, and stopping if any discrepancy exists. This step is not done in the prior art printing method described above. Therefore the prior art printing method doesn't have the accountability or error detection capability that the present invention does. There are many applications where printing material with errors is disastrous (e.g., financial applications, health applications. security applications).

The seventh step 7 is sending the result of the fifth step 5 to the printer for printing. Examples of possible printers include an Impress printer, a Postscript printer, a HP PCL printer, and a HP GL printer.

The eighth step 8 is comparing how many pages were sent to the printer in the seventh step 7 to how many pages were actually printed by the printer, reporting any discrepancy, and stopping if any discrepancy exists. here is another step not performed by the prior art printing method described above. This is another check on the printing process that does not exist in the prior art method. There are many applications as described above where the lack of such a check would be disastrous.

The ninth step 9 is comparing the sequence numbers and the check-sum numbers for the data records and the control records sent to the printer in the seventh step 7 to the corresponding sequence numbers and check-sum numbers in the document as received, reporting any discrepancy, and stopping if any discrepancy exists. This is yet another check on the printing process that does not exist in the prior art method. Here, the order and the similarity to the document as received of the data records and the control records is checked. Again, there are many applications as described above where the lack of such a check would be disastrous.

The tenth step 10 is returning to the third step 3 if it is desired to print another data file.

The eleventh, and last, step 11 is commanding the printer to print a report of what was printed. The eleventh step 11 may be accomplished by printing the table of contents of the document; printing, for each request to print a data file, a date stamp of the request, a title of the data file to be printed, and the number of pages to be printed; and printing, after each request printed in the last step, how the printer responded to the request, including the title of the data file, the number of pages requested to be printed, the number of pages printed, and a data stamp of when the data file was printed. The prior art method listed above does not account for what was printed as does the present method.

What is claimed is:

1. A method of printing in an accountable manner with error detection, comprising the steps of:
   a) receiving a document in a human-readable printer command language, where the document is comprised of at least one data file, where each at least one data file is comprised of at least one data record and at least one control record, where each of the at least one data record is associated with one of the at least one control record; where each of the at least one data record is comprised of an image, a sequence number, and a check-sum number; and where each of the at least one control record is comprised of a font type, a font size, a sequence number, and a check-sum number;
   b) generating a table of contents that lists each at least one data file in the document and each page on which each at least one data file would appear if printed;
   c) selecting a data file to print;
   d) determining on which pages the selected data file would appear if printed;
   e) converting the at least one data records and the at least one control records, including the corresponding sequence number and the check-sum number, on the pages identified in the last step from the human-readable printer command language of the document to a machine-readable format that a printer may print;
   f) checking each sequence number and check-sum number converted in the last step to the corresponding sequence number and check-sum number in the document received to see if the at least one data record and the at least one control record converted in the last step are in the same sequence as in the document as received and if any error occurred as a result of the last step, reporting any discrepancy, and stopping if any discrepancy exists;

g) sending the result of step (e) to the printer for printing;

h) comparing how many pages were sent to the printer in the last step to how many pages were actually printed by the printer, reporting any discrepancy, and stopping if any discrepancy exists;

i) comparing the sequence number and sum-check number for each at least one data record and each at least one control record sent to the printer in step (g) to the corresponding sequence number and check-sum number in the document as received, reporting any discrepancy, and stopping if any discrepancy exists;

j) returning to step (c) if it is desired to print another data file; and k) commanding the printer to print a report of what was printed.

2. The method of claim 1, wherein said step of receiving a document in a human-readable printer command language is comprised of the step of receiving a document in ASCII text.

3. The method of claim 1, wherein said step of converting the at least one data records and the at least one control records on the pages identified in the last step from the human-readable printer command language of the document to a machine-readable format that a printer may print is comprised of the step of converting the at least one data records and the at least one control records to binary.

4. The method of claim 1, wherein said step of sending the result of the last step to the printer for printing is comprised of the step of sending the result of the last step to the printer for printing wherein said printer is selected from the group of printers consisting of an Impress printer, a Postscript printer, a HP PCL printer, and a HP GL printer.

5. The method of claim 1, wherein said step of commanding the printer to print a report of what was printed is comprised of the steps of:

a) printing the table of contents of the document;

b) printing, for each request to print a data file, a date stamp of the request, a title of the data file to be printed, and the number of pages to be printed; and c) printing, after each request printed in the last step, how the printer responded to the request, including the title of the data file, the number of pages requested to be printed, the number of pages printed, and a data stamp of when the data file was printed.

6. The method of claim 1, wherein said step of receiving a document in a human-readable printer command language is comprised of the step of receiving a document in a human-readable printer command language wherein the human-readable printer command language is selected from the group of human-readable printer command languages consisting of Impress, Postscript, HP PCL, and HP GL.

7. The method of claim 6, wherein said step of receiving a document in a human-readable printer command language, where the document is comprised of at least one data file, where each at least one data file is comprised of at least one data record and at least one control record, where each of the at least one data record is associated with one of the at least one control record; where each of the at least one data record is comprised of an image, a sequence number, and a check-sum number; and where each of the at least one control record is comprised of a font type, a font size, a sequence number, and a check-sum number is comprised of receiving a document in Impress, where the document is comprised of at least one data file, where each at least one data file is comprised of at least one data record and at least one control record, where each of the at least one data record is associated with one of the at least one control record; where each of the at least one data record is comprised of an image, a sequence number, and a check-sum number; where each of the at least one data record includes a header for the data file and details of the data file; where each of the at least one control record is comprised of a font type, a font size, a sequence number, and a check-sum number; and where each of the at least one control record includes a header for a family table and details of the family table.

8. The method of claim 7, wherein said step of generating a table of contents that lists each at least one data file in the document and each page on which each at least one data file would appear if printed is comprised of the step of generating a table of contents that includes for each of the at least one data file the name of the at least one data file, a page number on which the at least one data file would appear if printed, the number of details of the data file, the position of the first of the details of the data file, and a pointer to a table of contents of the associated family table that includes the number of details of the family table and the position of the first of the details of the family table.

9. The method of claim 8, wherein said step of converting the at least one data records and the at least one control records on the pages identified in the last step from the human-readable printer command language of the document to a machine-readable format that a printer may print, where the sequence number and the sum-check number for each of the at least one data record and each of the at least one control record are preserved further includes the steps of:

a) replacing each instance of the letter i with "I";

b) replacing each instance of the number zero with the image of a zero with a forward slash through the zero; and c) replacing each instance of the number one with "1".

\* \* \* \* \*